United States Patent

[11] 3,584,449

| [72] | Inventor | Geoffrey Pollard<br>Pool Cottage, Dunham on the Hill,<br>Cheshire England |
| --- | --- | --- |
| [21] | Appl. No. | 834,848 |
| [22] | Filed | June 19, 1969 |
| [45] | Patented | June 15, 1971 |
| [32] | Priority | June 21, 1968 |
| [33] | | Great Britain |
| [31] | | 29622/68 |

[54] GARLAND TWISTING MACHINES OR APPARATUS
6 Claims, 2 Drawing Figs.

| [52] | U.S. Cl. | 57/1, 57/24, 57/143 |
| --- | --- | --- |
| [51] | Int. Cl. | D01h 3/04 |
| [50] | Field of Search | 57/1, 24, 40, 31, 48, 167, 143; 161/15 |

[56] References Cited
UNITED STATES PATENTS

| 2,072,560 | 3/1937 | Kranz et al. | 57/24 UX |
| --- | --- | --- | --- |
| 2,867,890 | 1/1959 | Baxter | 57/143 UX |
| 3,330,103 | 7/1967 | Rodermund | 57/143 X |

FOREIGN PATENTS

| 954,065 | 12/1949 | France | 57/24 |

*Primary Examiner*—Donald E. Watkins
*Attorney*—Linton and Linton

ABSTRACT: The invention resides in a machine for the manufacture more particularly of decorative twisted garlands, and broadly comprises a pair of oppositely moving rotary chucks, cutting means carried by one of said chucks, and means for operating said chucks in timed cyclic relationship whereby a web is drawn continuously from a supply means, and is twisted, by an alternate gripping and releasing of same by the oppositely moving chucks and is severed by the cutter each time said chucks reach distal positions.

PATENTED JUN 15 1971

3,584,449

INVENTOR:
GEOFFREY POLLARD
BY
Linton and Linton
ATTORNEYS

GARLAND TWISTING MACHINES OR APPARATUS

This invention relates more particularly, but not exclusively, to the manufacture of decorative garlands, and more especially, garlands which comprise an elongated web or webs of metal foil, or a plastics material, or paper, or the like, which have imparted thereto a permanent spiral twist and usually incorporate a strengthening strand of fine wire or/and thread.

Machines or apparatus for imparting the necessary twist to such garlands are known, but heretofore have suffered from a disadvantage in that, due to the need for cutting off predetermined lengths of the finished garland, and its delicate nature, their method of operation is of an intermittent character which slows down the rate of production considerably, and the present invention has for its object to provide an improved machine or apparatus which will enable continuous operation, whilst retaining the desirable feature of severing predetermined lengths of garland as it is produced, thereby expediting manufacture.

Broadly, according to the invention, and in one mode of embodiment, a machine or apparatus for twisting and cutting to length an elongated web or webs, comprises web supply means, a first rotary chuck, a second rotary chuck in opposed alignment with said first rotary chuck, means for reciprocating said chucks simultaneously towards and away from each other, cutting means carried by said first chuck, and means for operating said chucks and cutter in timed, cyclic, relationship whereby a web drawn continuously from the supply means by an alternate gripping and releasing of the oppositely moving chucks, is formed with a twist and is severed by the cutter each time said chucks approach distal positions.

Said chucks may conveniently be mounted by carrier means on a beam or guide rail and be reciprocated towards and away from each other on said beam or rail by means of an endless chain driven by a reversing motor, one of said chucks being connected to one run of said chain and the other to the reverse run thereof. Each chuck may be driven by an electric motor mounted upon its carrier.

Timed operation of the chucks, the cutter, and reversal of the electric motor driving the endless chain, may be effected in any convenient manner, as for example by approximately positioned limit or trip switches operated by the moving parts of the apparatus, or by appropriately situated photoelectric or other sensory devices.

The invention is further described with the aid of the accompanying drawings which illustrate schematically, and by way of example only, one mode of embodiment.

Figure 1:
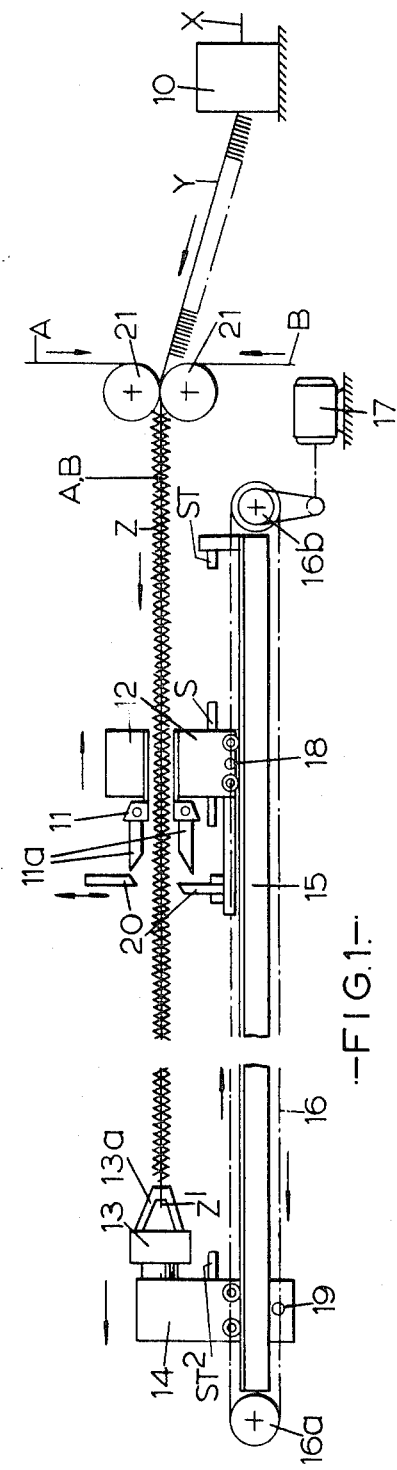
FIG. 1 depicts in side elevation apparatus for producing an ornamental twisted garland from a single plain web.

Referring now to said drawings, the numeral 10 denotes a supply source, in this instance, a fringing head whereat a web X of, for example, metallic foil drawn from a supply reel (not shown) is provided with closely arranged cuts at each side to provide a fringed effect as indicated at Y. The numeral 11 denotes a first rotary chuck with jaws 11a, 12 a carrier for said chuck, and 13 a second opposedly located rotary chuck with jaws 13a supported by a carrier 14. Said carriers 12 and 14 each incorporate an electric motor for driving said chucks.

A flanged beam 15 constitutes a guide rail for said carriers 12 and 14, and said carriers 12, 14 are arranged for reciprocating movement on said beam 15 towards and away from each other by means of an endless chain 16 carried by sprockets 16a, 16b and driven as from an electric reversing motor 17. The carrier 12 is attached at 18 to the upper run of the chain 16 and the carrier 14 to the lower run of said chain 16 at 19.

Also mounted on the carrier 12 is a guillotine 20 arranged so as to operate just in front of the jaws 11a of chuck 11.

In use, the fringed web Y is led from the fringing head 10 to the nip of a pair of guide rollers 21, through a bore of the carrier 12 first to the jaws 11a of the chuck 11 and then the jaws 13a of the chuck 13. In both cases, rotation of the chucks under the influence of their electric motors functions to impart to the web Y a twist as indicated at Z.

Also led between the nip of the rollers 21 from supply reels (not shown) is a strand of fine malleable wire A and a cotton or other thread B, the wire A serving to strengthen the finished garland and the thread B to add body thereto.

If desired, second or third web of material from additional supply sources may be led to the nip of the guide rollers 21.

Figure 2:
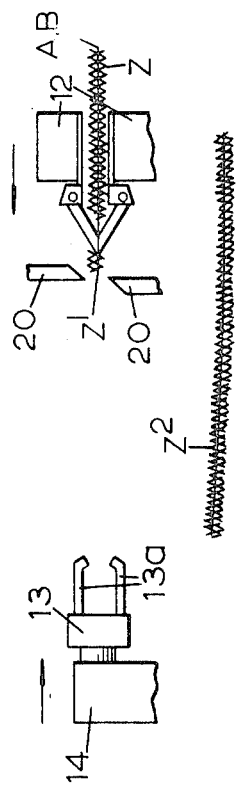
FIG. 2 is a fragmentary view depicting the chucks of FIG. 1 in reverse positions of operation.

A single cycle of operations is basically as follows:

Whilst the carriers 12, 14 are moving towards each other (FIG. 2) the leading end Z' of the garland is gripped by the jaws 11a of chuck 11, and as the web Y is prevented from rotation by the rollers 21, said web Z between said rollers 21 and the chuck 11 is subjected to a twisting action which incorporates with said web the threads A and B.

The jaws of the guillotine 20 are held open at this stage, and as the carriers 12, 14 reach proximal positions, the jaws 13a of the chuck 13 are closed to grip the leading end Z' of the web, the jaws 11a of the chuck 11 are opened, and as the carriers 12, 14 move apart twisting of the garland is continued without, or substantially without, interruption.

At the distal position of said carriers 12, 14, the jaws 11a close upon the web Z, and the guillotine 20 is actuated so as to sever the garland just in front of jaws thereby to provide a new leading end Z'. The jaws 13a of chuck 13 are opened simultaneously with operation of the guillotine 20, and thus a completed garland $Z^2$ (FIG. 2) of predetermined length is allowed to fall clear onto a suitably positioned support. The cycle is repeated automatically without interruption.

Timing of the various stages of operation of the apparatus may be initiated conveniently from the reversing gear of the electric motor 17, and be operated through a limit switch S of the carrier 12 actuation of which is effected by adjustable stops ST and $ST^2$ mounted respectively on the beam 15 and the carrier 14. Any other control means may of course be employed without departing from the scope of the invention.

It will be seen that the production of twisted web will be continuous, and that no time is lost during the reverse movements of the two chucks.

It will also be seen that the carriers 12 and 14 may readily be arranged so as to carry a plurality of rotary chucks as 11 and 13 whereby a plurality of garland lengths may simultaneously be produced, and that the length of the produced garlands may be controlled by varying the length of the travel paths of the rotary chucks.

It is envisaged that apparatus according to the invention may, mutatis mutandis, be employed with advantage in the laying up and twisting of webs or/and strands other than for the production of ornamental and decorative garlands.

I claim:

1. Apparatus for twisting and cutting to length an elongated web, comprising web supply means, a first rotary chuck, a second rotary chuck in opposed alignment with said first rotary chuck, means for reciprocating said chucks simultaneously towards and away from each other along guide means, cutting means carried by said first rotary chuck, and means for operating said rotary chucks and cutter in timed cyclic relationship whereby a web drawn continuously from the supply means by an alternative gripping and releasing of said web by the oppositely moving rotary chucks, is formed with a twist and a length severed therefrom by the cutter each time said chucks approach distal positions.

2. Apparatus, as claimed in claim 1, wherein said rotary chucks are mounted by carrier means on a guide rail and are reciprocated towards and away from each other by means of an endless chain driven by a reversing motor, one of said rotary chucks being connected to the upper run of said chain and the other rotary chuck to the lower run of said chain.

3. Apparatus, as claimed in claim 1 wherein said rotary chucks are driven by electric motors mounted on their carrier means.

4. Apparatus, as claimed in claim 2 wherein timed operation of said rotary chucks is effected by limit switches positioned for operation by the carriers of said chucks.

5. Apparatus, as claimed in claim 1, wherein a plurality of rotary chucks are provided on each carrier whereby a plurality of twisted web lengths may be produced simultaneously.

6. Apparatus, as claimed in claim 1, wherein the length of the travel path of said rotary chucks is adjustable.